United States Patent
Brüning et al.

(10) Patent No.: US 9,400,897 B2
(45) Date of Patent: Jul. 26, 2016

(54) METHOD FOR CLASSIFYING PARKING SCENARIOS FOR A SYSTEM FOR PARKING A MOTOR VEHICLE

(75) Inventors: Stefan Brüning, Berlin (DE); Mehmet Terkes, Braunschweig (DE); Torsten Wendler, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 5 days.

(21) Appl. No.: 14/346,022

(22) PCT Filed: Sep. 13, 2012

(86) PCT No.: PCT/EP2012/003839
§ 371 (c)(1),
(2), (4) Date: Jun. 6, 2014

(87) PCT Pub. No.: WO2013/041197
PCT Pub. Date: Mar. 28, 2013

(65) Prior Publication Data
US 2014/0292542 A1    Oct. 2, 2014

(30) Foreign Application Priority Data

Sep. 21, 2011 (DE) .......................... 10 2011 113 916

(51) Int. Cl.
*B60Q 1/48* (2006.01)
*G08G 1/14* (2006.01)
(Continued)

(52) U.S. Cl.
CPC ................ *G06G 1/14* (2013.01); *B62D 15/027* (2013.01); *B62D 15/028* (2013.01); *B62D 15/029* (2013.01)

(58) Field of Classification Search
CPC ............. B62D 15/027; B62D 15/0285; B62D 15/0275; B62D 15/028; B60W 30/06; B60W 10/18; B60T 7/22

USPC ........ 340/932.2, 425.5; 701/13, 25, 1, 41, 42, 701/36, 200
See application file for complete search history.

(56) References Cited

U.S. PATENT DOCUMENTS 6,424,895 B1    7/2002 Shimizu et al.
7,657,474 B1 *  2/2010 Dybala et al. ................... 705/35
(Continued)

FOREIGN PATENT DOCUMENTS

CN    101524998 A    9/2009
DE      3813083 A1    11/1989
(Continued)

OTHER PUBLICATIONS

Search Report for German Patent Application No. 10 2011 113 916.1; May 30, 2012.
(Continued)

*Primary Examiner* — Hoi Lau
(74) *Attorney, Agent, or Firm* — Barnes & Thornburg LLP (57) ABSTRACT

A method for classifying parking scenarios for an assistance system for parking a motor vehicle wherein a predetermined number of parking scenarios are defined, each parking scenario is described by a predetermined number of typical parking scenario criteria, and the criteria are based at least on parking space-specific parameters. The method includes determination of data from the environment of the motor vehicle by means of an environment sensor system in the motor vehicle, determination of the parking space-specific parameters from the environment data, examining the criteria of each parking scenario on the basis of the parking space-specific parameters, and classifying each parking scenario on the basis of the examined criteria.

13 Claims, 5 Drawing Sheets

(51) Int. Cl.
*G06G 1/14* (2006.01)
*B62D 15/02* (2006.01)

(56) References Cited

U.S. PATENT DOCUMENTS

| | | | |
|---|---|---|---|
| 8,521,366 B2* | 8/2013 | Schneider | B62D 15/0285 340/932.2 |
| 2003/0074129 A1 | 4/2003 | Curbow et al. | |
| 2004/0249564 A1* | 12/2004 | Iwakiri et al. | 701/200 |
| 2005/0049766 A1* | 3/2005 | Tanaka et al. | 701/36 |
| 2005/0049767 A1* | 3/2005 | Endo et al. | 701/36 |
| 2005/0057374 A1* | 3/2005 | Tanaka et al. | 340/932.2 |
| 2005/0060073 A1* | 3/2005 | Tanaka et al. | 701/36 |
| 2005/0225439 A1* | 10/2005 | Watanabe | B62D 15/027 340/435 |
| 2005/0264432 A1* | 12/2005 | Tanaka et al. | 340/932.2 |
| 2006/0190147 A1* | 8/2006 | Lee | B62D 15/0275 701/26 |
| 2008/0007618 A1* | 1/2008 | Yuasa | B60R 1/00 348/118 |
| 2009/0121899 A1* | 5/2009 | Kakinami et al. | 340/932.2 |
| 2009/0243889 A1* | 10/2009 | Suhr et al. | 340/932.2 |
| 2010/0019934 A1* | 1/2010 | Takano | 340/932.2 |
| 2010/0049402 A1* | 2/2010 | Tanaka | 701/41 |
| 2010/0332080 A1* | 12/2010 | Bae | 701/42 |
| 2011/0054739 A1* | 3/2011 | Bammert | B62D 15/028 701/41 |
| 2011/0057813 A1* | 3/2011 | Toledo et al. | 340/932.2 |
| 2011/0063131 A1* | 3/2011 | Toledo | B62D 15/027 340/932.2 |
| 2011/0087406 A1* | 4/2011 | Barth | B62D 15/027 701/41 |
| 2011/0140921 A1* | 6/2011 | Pampus | B62D 15/027 340/932.2 |
| 2011/0156928 A1* | 6/2011 | Ghisio | B62D 15/028 340/932.2 |
| 2011/0260887 A1* | 10/2011 | Toledo | B62D 15/0285 340/932.2 |
| 2011/0273310 A1* | 11/2011 | Kadowaki et al. | 340/932.2 |
| 2012/0004809 A1* | 1/2012 | Sasajima | B60K 35/00 701/41 |
| 2012/0013485 A1* | 1/2012 | Pampus | B60Q 9/006 340/932.2 |
| 2012/0062394 A1* | 3/2012 | Pampus | B62D 15/027 340/932.2 |
| 2012/0072067 A1* | 3/2012 | Jecker et al. | 701/25 |
| 2012/0173080 A1* | 7/2012 | Cluff | B62D 15/0285 701/42 |
| 2012/0197492 A1* | 8/2012 | Schneider | B62D 15/0285 701/41 |
| 2013/0073119 A1* | 3/2013 | Huger | B62D 15/027 701/1 |
| 2013/0085637 A1* | 4/2013 | Grimm et al. | 701/25 |
| 2013/0096732 A1* | 4/2013 | Hagenme et al. | 701/1 |
| 2013/0120161 A1* | 5/2013 | Wakabayashi et al. | 340/932.2 |
| 2014/0292542 A1* | 10/2014 | Bruning et al. | 340/932.2 |
| 2014/0371972 A1* | 12/2014 | Jecker et al. | 701/23 |

FOREIGN PATENT DOCUMENTS

| | | |
|---|---|---|
| DE | 102005017360 A1 | 11/2005 |
| DE | 102005044270 A1 | 3/2007 |
| DE | 102005045259 A1 | 3/2007 |
| DE | 102007002261 A1 | 8/2008 |
| DE | 102009026730 A1 | 12/2010 |
| DE | 102009027650 A1 | 1/2011 |
| DE | 102009029553 A1 | 3/2011 |
| DE | 102009041587 A1 | 3/2011 |
| DE | 102010008545 A1 | 8/2011 |
| EP | 2011701 A1 | 1/2009 |
| EP | 2098439 A2 | 9/2009 |
| JP | 2001199298 A | 7/2001 |
| JP | 2003175852 A | 6/2003 |
| JP | 2009205191 A | 9/2009 |
| WO | 2011029693 A1 | 3/2011 |

OTHER PUBLICATIONS

Search Report for International Patent Application No. PCT/EP2012/003839; Jan. 24, 2013.

* cited by examiner

METHOD FOR CLASSIFYING PARKING SCENARIOS FOR A SYSTEM FOR PARKING A MOTOR VEHICLE

PRIORITY CLAIM

This patent application is a U.S. National Phase of International Patent Application No. PCT/EP2012/003839, filed 13 Sep. 2012, which claims priority to German Patent Application No. 10 2011 113 916.1, filed 21 Sep. 2011, the disclosures of which are incorporated herein by reference in their entirety.

SUMMARY

Illustrative embodiments relate to a method for classifying parking scenarios for a system for parking a motor vehicle and to a parking assistance system for parking a motor vehicle in an assisted manner.

BRIEF DESCRIPTION OF THE DRAWINGS

Disclosed embodiments are explained below using the drawings, in which.

DETAILED DESCRIPTION OF THE DISCLOSED EMBODIMENTS

In current systems for the assisted parking of a motor vehicle in a parking space, the driver must select the parking scenario since the system can determine only the presence of a parking space as such from the environment data, with the result that the driver must select the parking scenario and therefore must define the strategy for parking the vehicle.

Therefore, disclosed embodiments simplify the method for the assisted parking of a motor vehicle for the driver and propose a parking strategy to the driver.

Disclosed embodiments provide a method for classifying parking scenarios for a parking assistant of a motor vehicle and provide a corresponding parking assistance system.

The method for classifying parking scenarios for an assistance system for parking a motor vehicle, a predefined number of parking scenarios being defined, each parking scenario being described by a predefined number of typical parking scenario criteria, and the criteria being based at least on parking-space-specific parameters, has the following steps of:

determining data relating to the environment of the motor vehicle using an environment sensor system of the motor vehicle, determining parking-space-specific parameters from the environment data, checking the criteria of each parking scenario using the parking-space-specific parameters, and classifying each parking scenario using the criteria which have been checked.

According to the method, parking scenarios, for example reversing into a parallel parking space, are defined or described by a predefined number of criteria. Parking-space-specific parameters, for example the length and depth of a free space suitable as a parking space, are determined using environment data. The parameters determined in this manner are then used to check the criteria of the parking scenario. If, for example, the length of the free space is therefore greater than a minimum length required for parking and if the parking space depth is also sufficient, the free space could be suitable as a parking space for the parking scenario and the parking scenario is classified accordingly. Therefore, any scenario can be assessed using the method and the most suitable parking scenario can be offered to the driver using the classification, as a result of which the method increases the driver's operating comfort.

The criteria of the parking space scenarios may also be based on motor-vehicle-specific parameters and/or driver-specific parameters and/or earlier parking scenarios and/or navigation data. In this case, motor-vehicle-specific parameters or driver-specific parameters may be, for example, the steering angle or the turning of the vehicle, from which the driver's wish to park in a potential parking space can be inferred. Furthermore, the current parking scenario can be inferred from the history of the driving profile, in other words from earlier parking scenarios. If, for example, the vehicle has driven past a plurality of perpendicular parking spaces and corresponding parked objects within a predefined interval of time, the current parking scenario will highly likely be a perpendicular parking space again. Information relating to a current parking scenario can also be gathered from navigation data, for example if the navigation data reveal that the vehicle is in a parking lot.

At least the following criteria may be used to describe the parking scenarios, each parking scenario comprising a typical parking scenario selection of the criteria:

bounding objects of a parking space, depth of the parking space, width of the parking space, background objects, objects in the environment of the motor vehicle, objects in a parking space or in a free space, turning of the vehicle, orientation of the bounding objects and history including assessment of the earlier parking scenarios.

In other words, there is a set of fundamental criteria which are used to describe the parking scenarios, only typical parking scenario criteria being used to describe a specific parking scenario. Therefore, the typical parking scenario criteria form a subset of the set of fundamental criteria.

The parking scenarios may also be assessed by evaluating the individual criteria of each parking scenario, the individual evaluations being combined to form a classification of each parking scenario. In this case, the assessment or classification can be carried out by assigning probabilities or by distributing point values. Furthermore, logical variables can be used to assess a parking scenario. If, for example, the length of a free space is not sufficient for a parallel parking space, parking scenarios such as driving forward or reversing into a parallel parking space can be excluded using the logical variables. In other words, the classification is then such that these parking scenarios do not come into question. If a plurality of parking scenarios come into question for a parking process, that parking scenario whose starting point is more suitable for parking is given a higher classification, for example. It is therefore important to make the classification such that optimal parking is possible.

At least the following scenarios "reversing into a perpendicular parking space", "reversing into a parallel parking space", "driving forward into a perpendicular parking space", "driving forward into a parallel parking space" and "driving forward into an oblique parking space" may also be defined using corresponding criteria typical of the scenario. In this case, the parking scenarios can also be differentiated with respect to the side of the vehicle. Furthermore, the rarer scenario "reversing into an oblique parking space" or "parking into an oblique parking space opposite the direction of travel" may also be defined.

The parking assistance system for parking a motor vehicle in a parking space using the method for classifying parking scenarios, as described above, comprises an environment sensor system for determining environment data relating to the motor vehicle, a storage device for storing a predefined number of parking scenarios with typical parking scenario criteria, a device for determining criteria-relevant parameters at least from the environment data, a checking device for checking the criteria of each parking scenario using the criteria-relevant parameters, a classification device for classifying the parking scenarios using the criteria which have been checked, and a selection device for selecting the parking scenario with the highest classification as the most probable parking scenario.

As a result of the classification of the parking scenarios, the most suitable parking scenario is then proposed to the driver or is automatically used, thus increasing the driving safety and the driver comfort.

The typical parking scenario criteria may also comprise motor-vehicle-specific parameters and/or driver-specific parameters and/or earlier parking scenarios and/or navigation data. It is thus possible to adapt the criteria used to possibilities available in the motor vehicle, for example. If there is no navigation system in the motor vehicle, it is also not possible to use any corresponding criteria for defining parking scenarios.

The classification device may also carry out a probability-based or a point-based evaluation of the criteria and the parking scenarios. In a point-based evaluation for example, points can be allocated to each criterion of a parking scenario when the criterion is satisfied. If, for example, a free space suitable as a parallel or perpendicular parking space has been identified, different points from those used for the perpendicular parking scenario are allocated to the criterion of parking space length with respect to parallel parking. Some criteria may likewise be interpreted as exclusion criteria since a parking space cannot be used if it does not have a sufficient width. The classification must therefore be interpreted accordingly.

The environment sensor system may be based at least on ultrasound-based 2D environment data information. The use of ultrasonic sensors is the most cost-effective way of implementing the parking assistance system, which does not exclude the use of environment sensor systems based on video, laser or radar, however.

The parking system may have an apparatus for matching the automatic classification and selection of the parking space by the driver, with the result that the driver can ultimately retain the decision relating to the parking process.

Figure 1:
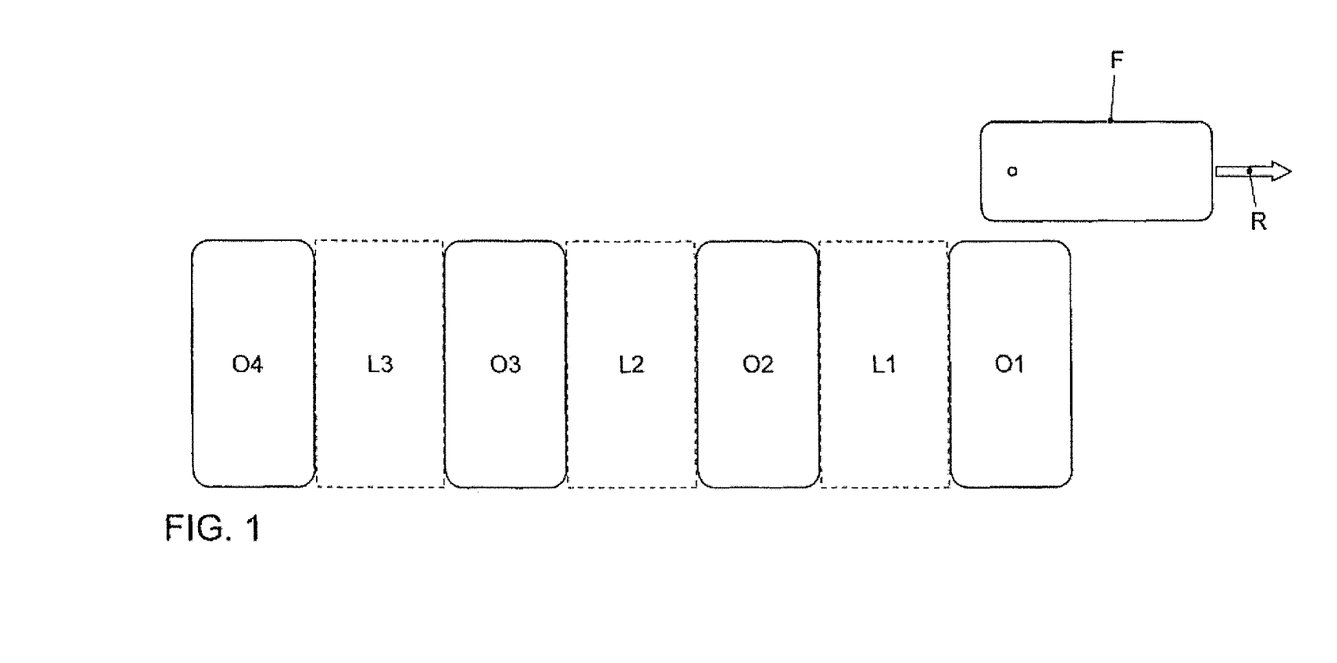
FIG. 1 shows the parking scenario "reversing into a perpendicular parking space"

FIG. 1 shows an example of the parking scenario "reversing into a perpendicular parking space". In this case, a driver's own vehicle F moves in the direction of the arrow R along a row of parked objects O1, O2, O3, O4 and the parking system (not illustrated) of the driver's own vehicle F has found, in addition to the objects O1, O2, O3, O4 which are usually implemented by parked vehicles, the free spaces or gaps L1, L2, L3 between the objects.

The following criteria for detecting a perpendicular parking space in the parking scenario "reversing into a perpendicular parking space" can come into question and can be checked:

width of the objects which bound the last free space in which perpendicular parking is possible. In the example in FIG. 1, this would be the width of the objects O1 and O2 which bound the free space L1, number of previously found free spaces in which perpendicular parking is possible. In the example in FIG. 1, these are the three gaps L1, L2 and L3, no curb object or other object in the free spaces L1, L2 or L3, width of the free space L1 found last, and depth of the free space L1 found last.

Figure 2:
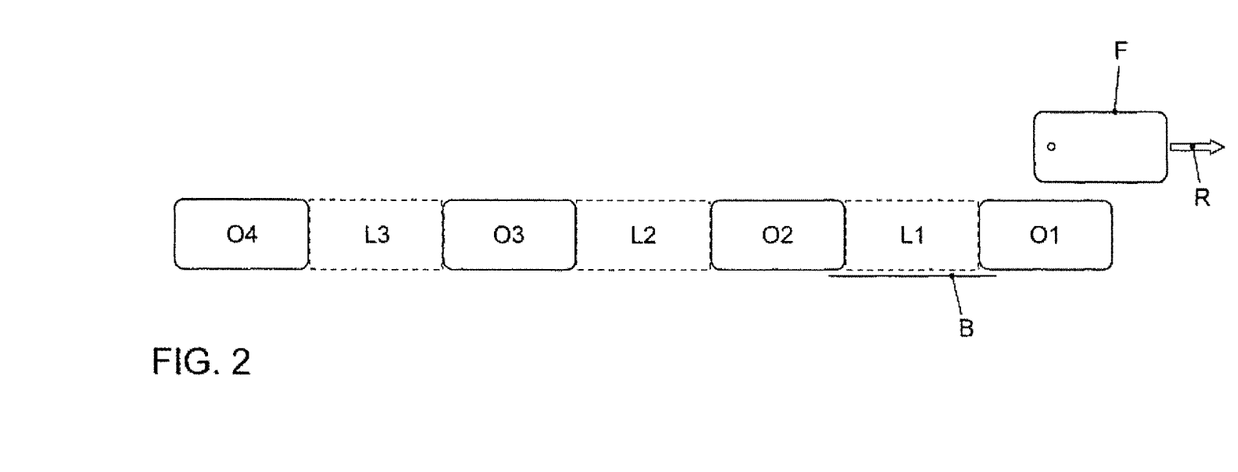
FIG. 2 shows the parking scenario "reversing into a parallel parking space"

FIG. 2 shows an exemplary illustration of the parking scenario "reversing into a parallel parking space" on the passenger side, the driver's own vehicle F having moved past the objects O1, O2 and O3, which represent parked vehicles, in the direction of the arrow R. Free spaces L1, L2, L3 which may possibly be suitable as parallel parking spaces are arranged between the objects O1, O2 and O3.

The following criteria may be checked for the parking scenario "reversing into a parallel parking space":

width of the objects which bound the last free space in which parallel parking is possible. In the example in FIG. 2, this would be the width of the objects O1 and O2 which bound the free space L1, number of previously found free spaces in which parallel parking is possible. In the example in FIG. 2, these are the three gaps L1, L2 and L3, no curb object or other object in the free spaces L1, L2 or L3, length of the free space L1 found last, depth of the free space L1 found last, and the curb B is at a particular free space depth.

Figure 3:
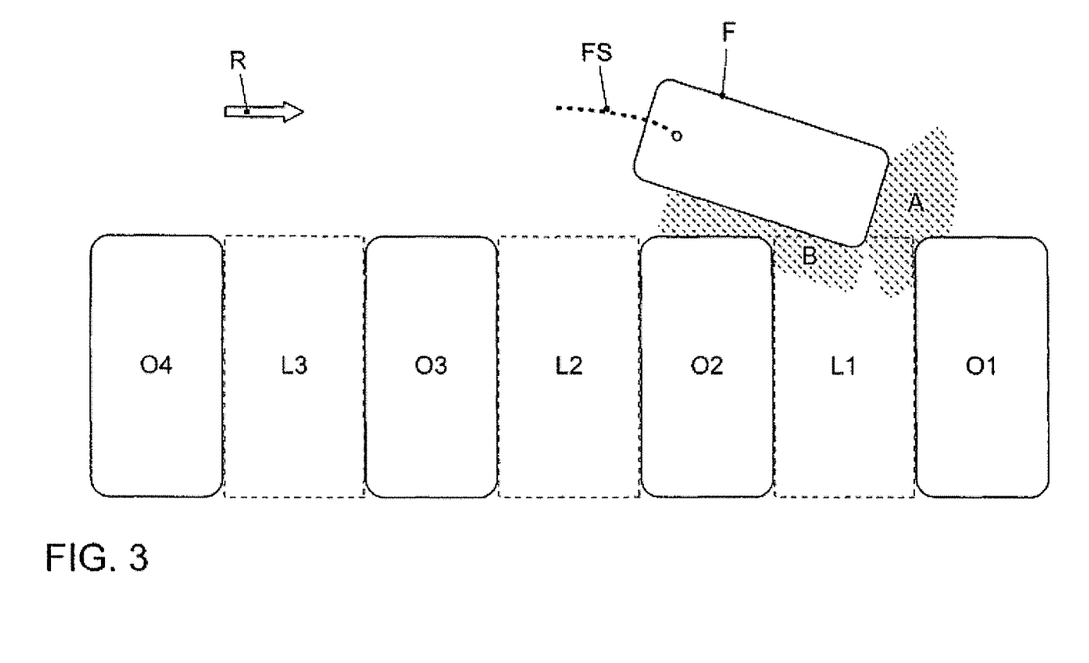
FIG. 3 shows the parking scenario "driving forward into a perpendicular parking space"

FIG. 3 shows the example of the parking scenario "driving forward into a perpendicular parking space" on the passenger side. The driver's own vehicle F has moved past a row of objects O1, O2, O3 and O4, usually parked vehicles, in the direction of the arrow R, free spaces L1, L2 and L3 being arranged between the objects O1, O2, O3 and O4. The driver's own vehicle F would like to drive forward into the free space L1 along the lane FS, for which purpose the driver has turned the vehicle.

The following criteria can come into question for detecting a perpendicular parking space in the parking scenario "driving forward into a perpendicular parking space" and can be checked:

width of the objects which bound the last free space in which perpendicular parking is possible. In the example in FIG. 3, this would be the width of the objects O1 and O2 which bound the free space L1, number of previously found free spaces in which perpendicular parking is possible. In the example in FIG. 3, these are the three gaps L1, L2 and L3, no curb object or other object in the free spaces L1, L2 or L3, width of the free space L1 found last, depth of the free space L1 found last, detection of an object O1 in an area A in front of the driver's own vehicle F, and detection of an object O2 in an area B to the side of the driver's own vehicle F.

Figure 4:
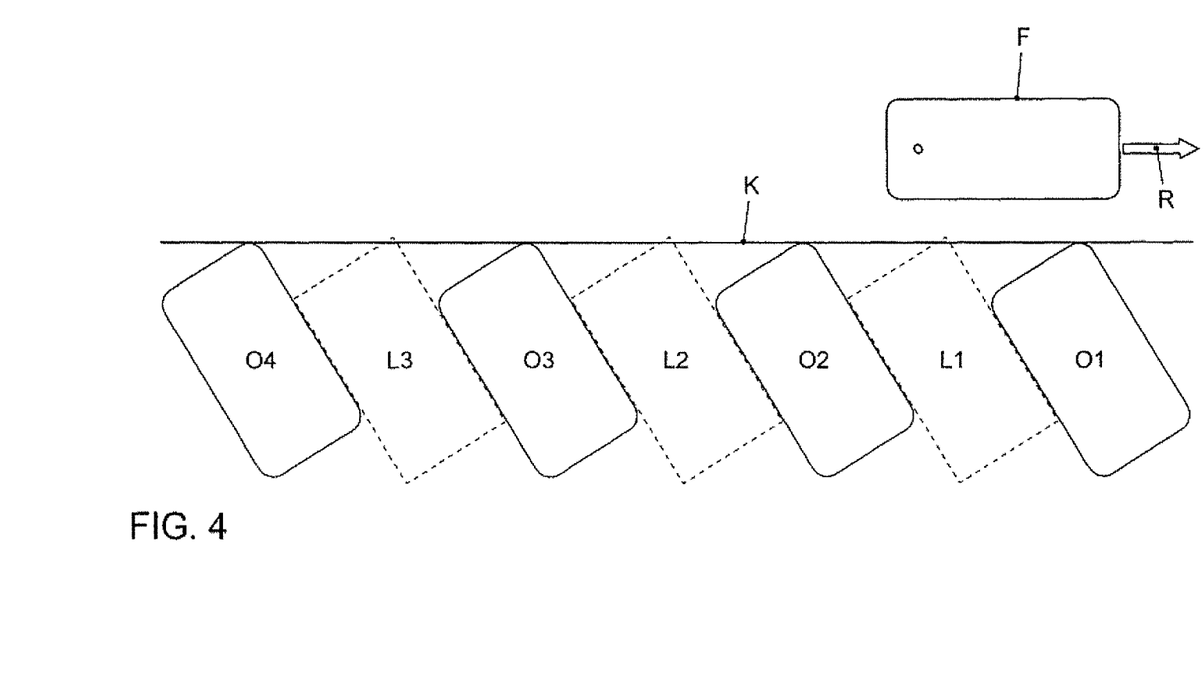
FIG. 4 shows the parking scenario "driving forward into an oblique parking space"

FIG. 4 shows an oblique parking situation on the passenger side, as is typical of the parking scenario "driving forward into an oblique parking space". In this case, parked vehicles referred to as objects O1, O2, O3 and O4 are arranged in a "fishbone" at an angle with respect to the edge K formed by the objects O1, O2, O3 and O4, the edge being oriented parallel to the direction of travel of the arrow R of the vehicle F. Free spaces L1, L2 and L3 which could be used for oblique parking can be discerned between the objects O1, O2, O3 and O4 arranged at an angle.

In this case, the following criteria for detecting an oblique parking space in the parking scenario "driving forward into a perpendicular parking space" can come into question and can be checked:

width of the objects which bound the last free space in which oblique parking is possible. In the example in FIG. 4, this would be the width of the objects O1 and O2 which bound the free space L1, number of previously found free spaces in which oblique parking is possible. In the example in FIG. 4, these are the three gaps L1, L2 and L3, no curb object or other object in the free spaces L1, L2 or L3, width of the free space L1 found last, depth of the free space L1 found last, and angle of the longitudinal axis of the free space L1 found last with respect to the edge K and/or angle of the front boundary of the objects O1 and O2 with respect to the direction of travel R or the edge K.

Figure 5:
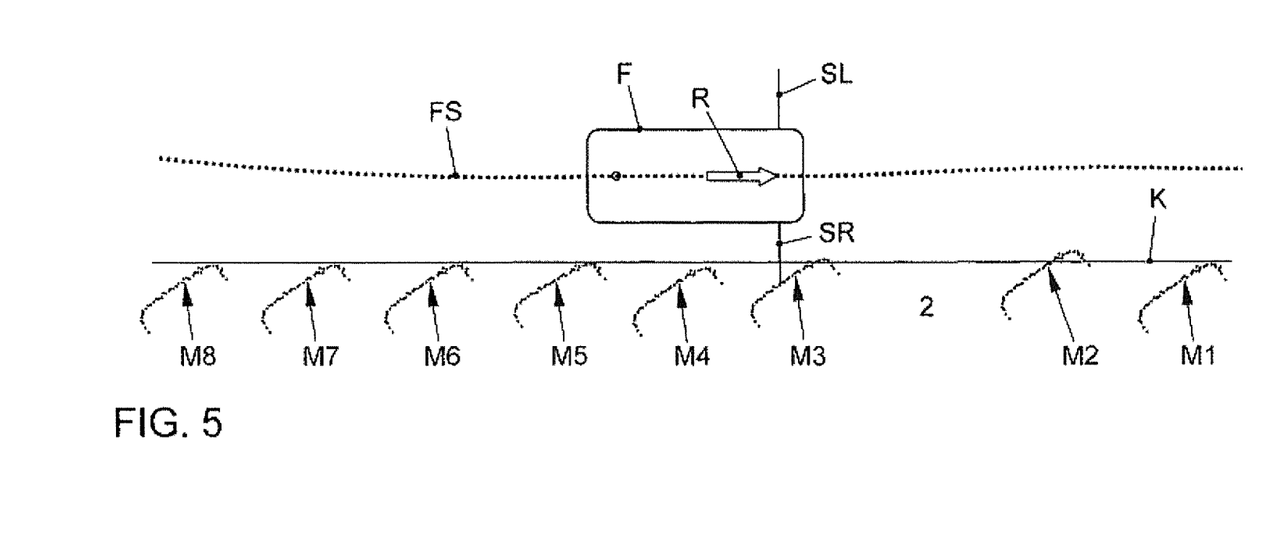
FIG. 5 shows ultrasonic measurement signals of an oblique parking space scenario.

FIG. 5 shows an example of a fishbone, that is to say an oblique parking situation on the passenger side, as this situation would be represented using measurement signals from an ultrasonic sensor system. A driver's own vehicle F moves along a lane FS in the direction of the arrow R. The driver's own vehicle has ultrasonic sensors SL and SR on the left-hand and right-hand sides. The ultrasonic sensor SR on the right-hand side would record measurement series M8 to M1 along the lane FS, each of the measurement series M8 to M1 obviously representing a front boundary of a parked vehicle, with the result that an angle with respect to the edge K can be determined for each measurement series M1 to M8. A free space L2 possibly suitable for oblique parking can be discerned between the measurement series M3 and M2.

Systems which assist the driver of a motor vehicle during parking, that is to say parking systems or parking assistance systems, belong to the group of driver assistance systems which are increasingly being used in vehicles to increase comfort, assist the driver and/or increase safety. The common feature of these systems is that they use a suitable measuring apparatus to measure the surroundings of their own vehicle and can use various algorithms to more or less effectively identify and measure parking spaces.

In particular, the search for sufficiently large parking spaces, followed by appropriate parking maneuvers, is a daily challenge for drivers of motor vehicles. At the same time, the development of the vehicle design, both for optical reasons and for safety-related reasons, has constantly reduced the visible area around the vehicle and has thus additionally made the parking task more difficult. Therefore, to relieve the driver and return authority, various parking assistance systems have been developed which assist the driver of a motor vehicle during parking or are intended to automatically carry out the parking process in the final expansion stage.

In its simplest form, such a parking assistant is a parking aid in which the distances between the vehicle and other vehicles or obstacles to the front and/or to the rear are measured and are displayed, for example, on a display in the cockpit. If predefined safety distances are undershot, an optical, acoustic and/or haptic warning is output to the driver, with the result that the latter can accordingly control his parking process. Such parking aids by now belong to the special equipment of mid-range vehicles.

In another embodiment, as described in DE 10 2005 017 360 A1 for example, a parking assistant for parking a motor vehicle comprises at least one display apparatus, an apparatus for measuring parking spaces and/or parking bays, a control device and a steering actuator, the apparatus having a display device with a multiplicity of display states which informs the driver of parameters relating to parking spaces or parking bays and of system states of the parking assistant.

In the further expansion stage, an automatic parking process is carried out after previously measuring the parking space, as is described in DE 3813083 A1, for example. The known apparatus comprises four switches for selecting the parking scenario, which switches can be used by the driver to specify the location and type of parking space. The driver can therefore select between a left-hand parking space, a left-hand parking bay, a right-hand parking space or a right-hand parking bay.

The document DE 10 2009 041 587 A1 shows a driver assistance device having a control device which outputs control signals to a drive or steering apparatus of the motor vehicle. The control signals then cause an autonomous or fully automatic parking process to be carried out. Furthermore, the control device can receive commands from a remote control and, after receiving a predetermined interrupt command, can interrupt a parking process of the motor vehicle which has already started. The driver assistance device comprises at least one camera which is coupled to the control device and provides image data relating to an area surrounding the motor vehicle, the control device transmitting signals to the remote control which comprise the image data acquired by the camera or image data calculated therefrom.

Furthermore, the document DE 10 2009 027 650 A1 shows an apparatus for parking a vehicle in a parking space in an assisted manner, having at least one sensor device which can be used to detect at least one object in a vicinity of the vehicle. The apparatus is designed to numerically determine the presence of at least one object in an area remote from the vehicle, the object in the remote area being numerically determined on the basis of the detected object in the vicinity. Objects are understood as meaning, for example, parked vehicles or structural facilities.

LIST OF REFERENCE SYMBOLS

F Vehicle
FS Lane
O1 Object 1
O2 Object 2
O3 Object 3
O4 Object 4
L1 Gap 1
L2 Gap 2
L3 Gap 3
A Area in front of the vehicle
B Area to the side of the vehicle
K Edge
SL Sensor on the left
SR Sensor on the right
M1 Measurement series
M2 Measurement series
M3 Measurement series
M4 Measurement series
M5 Measurement series
M6 Measurement series M7 Measurement series
M8 Measurement series

The invention claimed is:

1. A method for classifying parking scenarios for an assistance system for parking a motor vehicle, a predefined number of parking scenarios being defined and each parking scenario being described by a predefined number of typical parking scenario criteria, the criteria being based at least on parking-space-specific parameters, the method comprising:
    determining data relating to the environment of the motor vehicle using an environment sensor system of the motor vehicle;
    determining parking-space-specific parameters from the environment data;
    checking the criteria of each parking scenario using the parking-space-specific parameters; and
    classifying each parking scenario using the criteria which have been checked;
    wherein the following parking scenarios: "reversing into a perpendicular parking space", "reversing into a parallel parking space", "driving forward into a perpendicular parking space", "driving forward into a parallel parking space" and "driving forward into an oblique parking space" are defined
    wherein a type of parking space in the parking scenario is detected by checking criteria including a number of previously found free spaces in which one of perpendicular, parallel, or oblique-type parking is possible.

2. The method of claim 1, the criteria of the parking space scenarios are also based on motor-vehicle-specific parameters and/or driver-specific parameters and/or earlier parking scenarios and/or navigation data.

3. The method of claim 1, wherein the following criteria of each parking scenario are used to describe the parking scenarios, each parking scenario comprising a typical parking scenario selection of the criteria:
    bounding objects of a parking space, depth of the parking space, width of the parking space, background objects, objects in the environment of the motor vehicle, objects in a parking space, turning of the vehicle, orientation of the bounding objects and history including assessment of the earlier parking scenarios.

4. The method claim 1, wherein the parking scenarios are assessed by evaluating the individual criteria of each parking scenario, the individual evaluations are combined to form a classification of each parking scenario.

5. The method of claim 4, wherein the classification is carried out by assigning probabilities or by distributing point values.

6. A parking assistance system for parking a motor vehicle in a parking space having an environment sensor system for determining environment data relating to the motor vehicle, the parking assistance system comprising:
    a storage device for storing a predefined number of parking scenarios with typical parking scenario criteria;
    a device for determining criteria-relevant parameters at least from the environment data;
    a checking device for checking the criteria of each parking scenario using the criteria-relevant parameters;
    a classification device for classifying the parking scenarios using the criteria which have been checked; and
    a selection device for selecting the parking scenario with the highest classification as the most probable parking scenario;
    wherein the following parking scenarios: "reversing into a perpendicular parking space", "reversing into a parallel parking space", "driving forward entering into a perpendicular parking space", "driving forward entering into a parallel parking space" and "driving forward into an oblique parking space" are stored in the storage device;
    wherein the parking assistance system uses the selected parking scenario to park the vehicle in the parking space.

7. The parking assistance system of claim 6, wherein the typical parking scenario criteria also comprise motor-vehicle-specific parameters and/or driver-specific parameters and/or earlier parking scenarios and/or navigation data.

8. The parking system of claim 6, wherein the classification device carries out a probability-based or a point-based evaluation of the criteria and the parking scenarios.

9. The parking assistance system of claim 6, wherein the environment sensor system is based at least on ultrasound-based 2D environment data.

10. The parking assistance system of claim 6, wherein a type of parking space in the parking scenario is detected by checking criteria including a number of previously found free spaces in which one of perpendicular, parallel, or oblique-type parking is possible.

11. The parking assistance system of claim 6, wherein a type of parking space in the parking scenario is detected when the vehicle has driven past a plurality of the same type of parking spaces and corresponding parked objects within a predefined interval of time.

12. The method of claim 1, wherein checking criteria including a number of previously found free spaces in which one of perpendicular, parallel, or oblique-type parking is possible comprises checking a number of previously found free spaces within a predefined interval of time.

13. The parking assistance system of claim 6, wherein the checking device for checking the criteria of each parking scenario using the criteria-relevant parameters checks criteria including a number of previously found free spaces in which one of perpendicular, parallel, or oblique-type parking is possible comprises checking a number of previously found free spaces within a predefined interval of time.

* * * * *